United States Patent [19]
Kume

[11] 4,133,587
[45] Jan. 9, 1979

[54] BEARING WITH AN INTERMEDIATE RACE
[75] Inventor: Takeshi Kume, Amagasaki, Japan
[73] Assignee: Suehiro Seiko Co., Ltd., Hyogo, Japan
[21] Appl. No.: 805,125
[22] Filed: Jun. 9, 1977
[30] Foreign Application Priority Data
Jun. 21, 1976 [JP] Japan ............................... 51-73664
[51] Int. Cl.² .................... F16C 19/22; F16C 33/34
[52] U.S. Cl. ...................................... 308/183; 308/8; 308/215; 308/DIG. 4
[58] Field of Search ............... 308/183, 8, 202, 207 R, 308/207 A, 215, 209, DIG. 4, DIG. 14

[56] References Cited
U.S. PATENT DOCUMENTS

| 1,005,473 | 10/1911 | Rennerfelt | 308/215 |
| 2,431,810 | 12/1947 | Knaak | 308/209 |
| 3,056,637 | 10/1962 | Shanley et al. | 308/DIG. 4 |
| 4,002,380 | 1/1977 | Bowen | 308/215 |

FOREIGN PATENT DOCUMENTS

| 404203 | 1/1923 | Fed. Rep. of Germany | 308/183 |
| 946559 | 6/1949 | France | 308/215 |
| 107152 | 6/1917 | United Kingdom | 308/DIG. 4 |

Primary Examiner—Trygve M. Blix
Assistant Examiner—Charles E. Frankfort
Attorney, Agent, or Firm—Merriam, Marshall & Bicknell

[57] ABSTRACT

A bearing comprising at least one intermediate idling race rotatable between fixed and rotating races and a predetermined number of sets of elastic sleeve and roller distributed outside and inside the idling race between the fixed and rotating races. The sleeve encloses therewithin the roller having a diameter slightly smaller than the inner diameter of the sleeve. The sleeves roll is compressed between the races against the rollers so that the idling race can rotate at a controlled speed as the rotating race rotates.

5 Claims, 4 Drawing Figures

BEARING WITH AN INTERMEDIATE RACE

BACKGROUND OF THE INVENTION

1. Field of the Invention

This invention relates to a bearing comprising a bearing body, a revolving element and at least one intermediate idling member, e.g. an intermediate race or bush, as interposed between said bearing body and revolving element.

2. Description of the Prior Art

A bearing will seize with heat of friction increasing mainly with the rotational speed and the load on the friction surfaces. The magnitude of such heat of friction is proportional to the 2nd to 4th root of the load and to about the second power of the rotational speed when the speed is high. Thus, the generation of heat of friction is largely influenced by the rotational speed.

It is known that a floating bush is interposed in a free space between a revolving shaft and an outer race of a plain bearing, so as to reduce such heat of friction attributable to rotational speed, and that if said bush can be turned at half the speed of the revolving shaft, the heats of friction in the inner and outer surfaces of the bush will each be a quarter of the heat which would be generated between the shaft and the bearing without such a bush, with the sum of the heats at both surfaces being still as low as a half of the latter. Practically, in order to rotate the floating bush at half the speed of the revolving shaft, however, the conditions must be satisfied that the shaft revolves at an extremely high speed with a minimum bearing load and that the clearance outside the floating bush is considerably larger than that inside the bush. Thus, the application of such a principle to general bearings has been difficult.

SUMMARY OF THE INVENTION

In view of the above problem, the present invention provides a bearing which essentially comprises a fixed member or outer race, a rotating member or inner race and at least one intermediate idling race or bush interposed between the fixed and rotating members.

It is an object of the invention is to provide a variety of bearings having, for example, one intermediate race, where moments of rolling or sliding friction outside and inside the idling race between the outer and inner races are adjusted so as to rotate the idling race at a speed as near as possible to half the speed of the inner race or rotating shaft, whereby each heat of friction generated outside and inside the idling race will be reduced to about a quarter of the heat which would be generated in the absence of such an idling race or bush, thereby increasing the maximum permissible speed of the shaft.

BRIEF DESCRIPTION OF THE DRAWINGS

This and other objects of the invention will become apparent from the following detailed description of preferred embodiments by refrence to the accompanying drawings shown in a manner not limited but illustrative, wherein.

DESCRIPTION OF THE PREFERRED EMBODIMENTS

Figure 1:
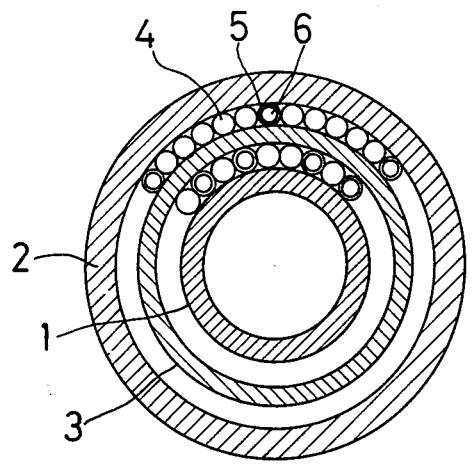
FIG. 1 is a radially sectional view showing an embodiment of this invention.

The first embodiment of this invention depicted in FIG. 1 for a roller bearing has one intermediate idling race. An inner race 1 is fixed to a revolving shaft, and an outer race 2 is secured to a bearing body or casing. An intermediate idling race 3 is interposed between races 1 and 2. A multiplicity of rollers 4 are distributed in each clearance between these races.

In such an arrangement of conventional rollers 4 inside and outside of the intermediate race 3, because the moment of friction inside of the intermediate race 3 is smaller than that outside of the race 3, the race 3 revolves at a speed considerably lower than half the rotational speed of the revolving shaft or race 1. Therefore, it might be contemplated to control the rotation of the intermediate race following the revolving shaft by the rollers with diameters different between outside and inside of the intermediate race. However, this practically is not sufficient to rotate the idling race at half the speed of the revolving shaft.

Figure 2:
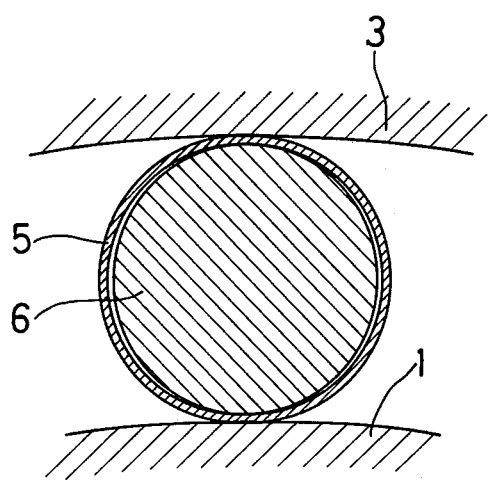
FIG. 2 is an enlared cross-section view showing the pressure-contact sleeve.

As shown in detail in FIG. 2, this invention provides elastic pressure-contact sleeves or rings 5 of steel or the like enclosing the rollers 6. The diameter of rollers 6 is slightly smaller than the inner diameter of said sleeves 5; the sum of the diameter of roller 6 and twice the thickness of the wall of sleeve 5 equaling the diameter of single roller 4. The sleeves 5 are placed and compressed or biased radially between the races so as to expand in the rotational direction of the races, with roller 6 engaging the sleeve 5 at two points against the races. Since the rotation of races 1 and 3 causes sleeves 5 to turn in biased engagement with rollers 6 and the races, the sets of ring 5 and roller 6 have a larger rolling frictional force than that of unitary rollers 4.

An appropriate number of such sets of roller 6 and sleeve 5 are substituted for single rollers 4 inside the idling race 3 or both inside and outside it so that the ratio of the number of the roller-sleeve sets to the number of unitary rollers 4 on the outside of the intermediate race 3 will be smaller by a predetermined amount than that on the inside of the intermediate race 3. By such arrangement, the moments of rolling friction between the inner race 1 and intermediate race 3 and between the intermediate race 3 and outer race 2 are controlled so that the idling race 3 will follow the revolving shaft or race 1 at a speed as equal as possible to half the speed of race 1, that is to say, the relative speed of inner race 1 and intermediate race 3 is made as equal as possible to the relative speed of the intermediate race 3 and outer race 2.

Let it be assumed that the small-diameter roller 6 is not installed within the sleeve 5. The frictional surfaces of races 1, 2 and 3 and pressure-contact sleeve 5 are finished so smooth that the sliding frictional force of the sleeve 5 will be small as represented by the formula: F(frictional force)= (0.001 to 0.0005) × W(load). Since the rolling frictional force of the sleeve 5 is considerably larger than the sliding frictional force, the sleeve 5 will not roll but merely slide. Thus, this produces no rolling frictional force with which to control the relative speeds of the races. Therefore, to increase the sliding frictional force at the points of contact between the pressure-contact sleeve 5 and the bearing races, said roller is installed within the pressure-contact sleeve. Because, in this arrangement, a portion of the bearing load is now applied to sleeve 5 against roller 6, the frictional force at the contact points of sleeve 5 is increased so that the sleeve can roll and the resultant rolling frictional force thereof will control the rotation of the intermediate race 3.

Of course, where the bearing load is small, it is necessary to design and employ pressure-contact sleeves having a wall thin enough to make the sleeves rotate without sliding.

Figure 3:
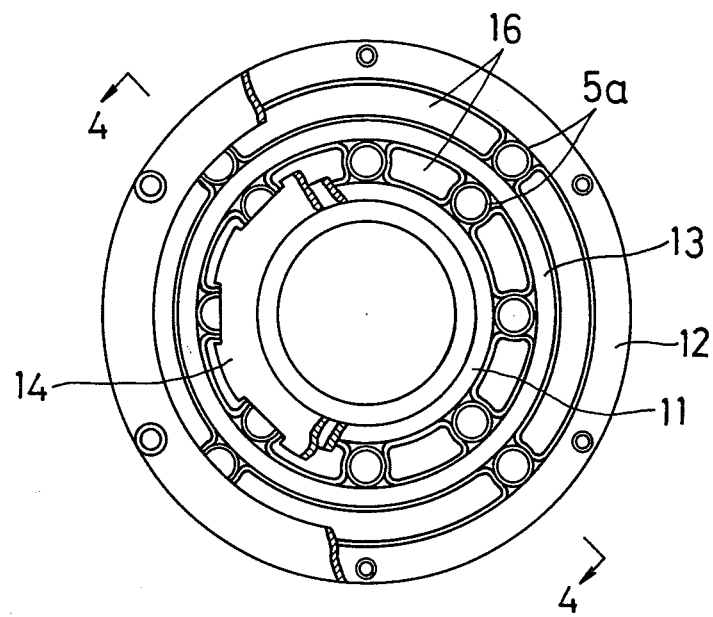
FIG. 3 is an end view partially cut away showing another embodiment.
Figure 4:
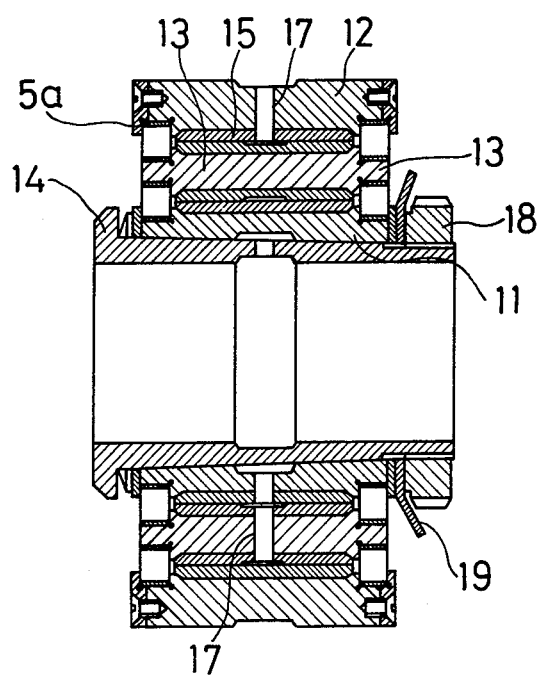
FIG. 4 is a cross-section taken on the line 4—4 of FIG. 3.

FIGS. 3 and 4 show another embodiment of the present invention as applied to a plain bearing having an intermediate idling bush to operate in a manner and on a basis substantially the same as the first embodiment of FIG. 1. An intermediate idling bush or race 13 is interposed slidably between an outer race 12 and an inner race 11 fixed to an adapter sleeve 14, with each alloy liner 15 facing another. Annular spaces defined by grooves formed oppositely between extensions at the both edges of races 11, 12 and 13 are loaded with a predetermined number of elastic sleeves 5a as shown in FIG. 3 which have an outer diameter slightly larger than the distance between the bottoms of said annular grooves of the adjacent races. Spacers 16 are placed preferably across each sleeve 5a. In some cases, sleeves 5a and spacers 16 may not be necessary outside of bush 13. In this embodiment for plain bearings, sleeves 5a should enclose no small-diameter rollers therewithin as in FIG. 2, since the sleeves are likely to receive different bearing loads as liners 15 wear down during long-time rotation. In this cas, it is necessary to apply bakelite or other materials having a great coefficient of friction to the portions of the races and bush on which the sleeves 5a slide, thereby increasing the sliding friction so that the sleeves can roll without sliding. Oil holes are designated at 17; a nut for locking the adapter at 18 and a stopper at 19. Conventional single rollers such as rollers 4 in FIG. 1 may be used in place of sleeves 5a to control the frictional moment to some extent.

According to the present invention, as hereinbefore described, where one intermediate idling race or bush is interposed between the inner and outer races, the relative rotational speed of adjacent two of the outer, intermediate and inner races is adjusted to near half the rotational speed of the shaft; where the number of the idling races is 'n', the relative rotational speed of any adjacent two of the races is adjusted to near $1/n + 1$ of the shaft's rotational speed. This results in a considerably reduced generation of heat of friction, which increases the maximum safe and stable rotational speed of the shaft. Since the rotation of the idling race is adjusted purely by frictional moments between the bearing races rotating by virture of the shaft's rotation, there is no need for a motor or other extra driving means to rotate the idling race at a predetermined speed, thus simplifying the construction of the bearing system. Moreover, the pressure-contact sleeve enclosing the small-diameter roller is not liable to be deformed and can engage the bearing races against the enclosed roller so that the sleeve is prevented from slipping on the races, thereby minimizing the wear of the sleeve.

What is claimed is:

1. A bearing comprising
   at least one idling member rotatable between and substantially concentrically with a fixed member and a rotating member and
   a plurality of elastic sleeve and roller sets distributed between said idling member and at least one of said rotating and fixed members, such that in each of said sets said sleeve is compressed radially against two points on said roller between said members,
   said sleeve enclosing therewithin said roller and said roller having a diameter slightly smaller than the inner diameter of said sleeve,
   the number of the sleeve and roller sets being selected so as to adjust the relative frictional resistance between said fixed and idling members and between said idling and rotating members, thereby allowing said idling member to rotate at a predetermined speed as said rotating member rotates.

2. A bearing as claimed in claim 1, and further comprising at least one roller between said idling member and at least one of said fixed and rotating members, said roller being larger in diameter than said roller enclosed within said sleeve.

3. A bearing as claimed in claim 1 further comprising spacers placed across at least one of said sleeve and roller sets.

4. A sliding bearing comprising
   at least one idling member rotatable slidably between and substantially concentrically with a fixed member and a rotating member and
   a predetermined number of elastic sleeves distributed in spaces formed between said idling member and at least one of said rotating and said fixed members, such that said sleeve is compressed radially between said members,
   the number of said sleeves being selected so as to adjust the relative frictional resistance between said rotating and idling members and between said fixed and idling members, thereby allowing said idling member to rotate at a predetermined speed as said rotating member rotates.

5. A sliding bearing as claimed in claim 4 further comprising spacers placed across at least one of said sleeves.

* * * * *